United States Patent Office 2,960,967
Patented Nov. 22, 1960

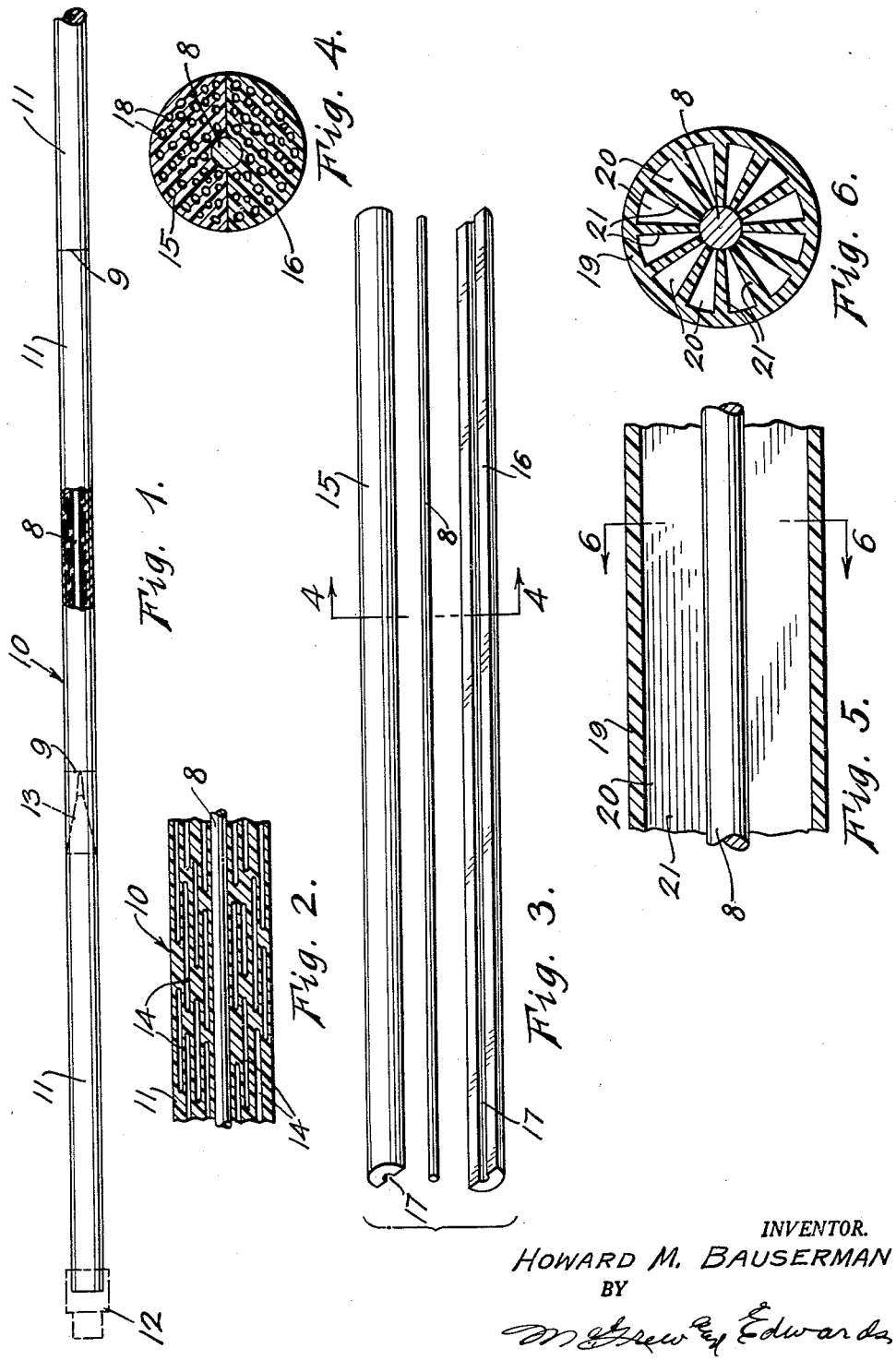

2,960,967

EXTRUDED PLASTIC LEAD PENCILS

Howard M. Bauserman, Factory Grounds, American Crystal Sugar Company, Rocky Ford, Colo.

Filed Aug. 10, 1955, Ser. No. 527,545

1 Claim. (Cl. 120—83)

The present invention relates to extruded plastic lead pencils and method of making the same. It has to do particularly, although not exclusively, with so-called "throw away" lead pencils whose body portions or sheaths are formed, for example, from porous plastic in continuous lengths of stock and later severed into pencil size or sizes, in which the body portions or sheaths grip the lead and prevent its movement relative to said body portions.

One of the objects of the present invention is to provide an extremely low cost, lightweight lead pencil which can be used as a "throw away" item in offices, homes, business establishments of various kinds, railroad, bus and airline terminals, and in fact, at any place or location where the public gathers; another object being to provide a method or process for producing such pencils.

A further object is to provide a porous plastic pencil of different colors and one which may have writing lead of different colors, as well as a method for producing the same preferably by means of an extruding device.

The above and other objects of the invention will appear from the following description and appended claim when considered in conjunction with the accompanying drawing forming a part of this specification wherein like reference characters designate corresponding parts in the several views.

In said drawing:

Fig. 1 is a top plan view, partly broken away, of a preferably extruded length of plastic and writing lead pencil stock after ejection from an extruding device, and illustrating in broken lines a substantially completed lead pencil at the forward or left end of the lead pencil stock;

Fig. 2 is an enlarged fragmentary longitudinal sectional elevation of a short length or piece of the lead pencil stock shown in Fig. 1, and showing the porosity of the plastic in exaggerated manner;

Fig. 3 is an exploded view of a length of lead pencil stock embodying a different form of the present invention;

Fig. 4 is an enlarged sectional view taken substantially along the line 4—4 of Fig. 3, looking in the direction of the arrows, showing the parts in assembled relationship and illustrating the porosity of the plastic of the stock;

Fig. 5 is an enlarged fragmentary longitudinal sectional elevation of a modified form of extruded plastic and writing lead stock embodying the invention; and Fig. 6 is a sectional view taken substantially along the line 6—6 of Fig. 5, looking in the direction of the arrows.

Before explaining in detail the present invention it is to be understood that the invention is not limited in its application to the details of construction and arrangement of parts illustrated in the accompanying drawing, since the invention is capable of other embodiments and of being practiced or carried out in various ways. It is to be understood also that the phraseology or terminology employed herein is for the purpose of description and not of limitation, and it is not intended to limit the invention claimed herein beyond the requirements of the prior art.

Referring now particularly to Figs. 1 and 2 of the drawing, there is shown a length of porous plastic which has been extruded by an extruding device and which comprises a body portion of the porous plastic with a central length of writing lead disposed therein. The series of articles forming the continuous length of stock 10 of extruded plastic are, when finished, so-called "throw-away" lead pencils. The tube 10 contains a centrally disposed continuous piece of writing lead 8 and is preferably severed or cut at the points indicated at 9 to provide a plurality of lead pencils 11. After a lead pencil or section 11 is severed from the continuous length 10, an eraser and eraser cap 12 is mounted upon one end of the pencil 11, its other end being pointed and sharpened, as seen at 13 in Fig. 1.

It is to be understood that the continuous length of pencil-forming lead-centered porous plastic 10, after extrusion onto a flat surface, may be severed into sections or portions of equal length, the erasers applied, and the sections pointed and sharpened to provide finished lead pencils, by any suitable equipment or apparatus, and by any method or process suitable for mass production of the "throw away" pencils.

With reference to Fig. 2, an enlarged fragmentary longitudinal section of one of the pencils 11 of Fig. 1 is shown. This section contains writing lead 8 which is firmly gripped by the plastic body and the exaggerated showing displays the porosity of the plastic material by illustrating a series of irregularly sized and perhaps shaped pores or pockets 14. Thus, an extremely light and, of course, a very inexpensive article is produced.

With reference to Figs. 3 and 4, a modified form of pencil embodying the present invention is shown. The pencil of this form is preferably in two elongated halves of porous plastic, represented at 15 and 16. Each half is provided with a centrally disposed groove 17, and the sections or halves are semi-circular in cross section, see especially Fig. 3.

The enlarged section of Fig 4 shows the porosity of the plastic, pores or openings 18 being seen in this view. The halves 15 and 16 may be formed by molding or by an extrusion method and then assembled to grippingly engage the lead 8. The thus assembled elongated article may be severed or cut into lead pencil lengths, each being provided with an eraser and each being pointed and sharpened, as indicated at 12 and 13, respectively, in Fig. 1. The two halves may be caused to be held in intimate relationship in various ways and in accordance with accepted lead pencil manufacture. A suitable cement having an affinity for the porous plastic halves may be employed.

Figs. 5 and 6 illustrate a further modification of the present invention. These views have been enlarged for the purpose of illustrating the particular type of porosity of the plastic material. This form of lead pencil material contains a central writing lead or pigment stick 8 and the body has a shell 19 which is so arranged as to provide elongated air spaces or voids 20 separated by elongated fins, webs or partitions 21, see Fig. 6, the internal edges of which form a substantially circumferential central support surface for the writing lead 8. In accordance with this form, the porosity of the pencil body may be the result of the regular or irregular positioning of the voids of air spaces 20. It is to be understood that while only a short section or fragment of this form of the invention is illustrated, the plastic with its central writing lead or pigment will be extruded by an extruding machine or device in long lengths of the composite structure which may be divided into like-sized lead pencils, each of which is provided with an individual eraser and is pointed and sharpened at its opposite end.

It is to be noted particularly that one of the important features of the invention described above, claimed below, and illustrated in the accompanying drawing, in accordance with its several forms, is the use of an extremely porous plastic material from which the body portion of the stock is formed. It is also to be noted that by virtue of the longitudinal pores or voids, the lead pencils formed from the stock are of extremely light weight due to the porosity but they have great strength since the voids extend lengthwise rather than transversely or crosswise of the plastic stock.

In addition to the foregoing forms, the invention contemplates producing a porous plastic pencil containing longitudinal perforations made by wrapping the pencil lead with a fibrous material, such as rayon yarn which was porous. The filaments of the yarn would be made to adhere by the application of a thermoplastic resin. Or, if desirable, the filaments could be heated during extrusion to a temperature which would cause them to adhere to one another, but would not of necessity cause a complete destruction of their filament characteristics.

I claim:

As a new article of manufacture a relatively rigid tubular plastic writing instrument comprising an extrusion of relatively light weight forming a lead pencil body, said extrusion having a smooth outer shell and a series of spaced relatively thin radial webs extending from said shell with air spaces lengthwise between the webs and with such radial webs having longitudinally disposed edges forming a substantially circumferential central supporting surface engaging an enclosed writing lead, said edges being substantially equal in length to the writing lead to thereby provide continuous lengthwise gripping engagement with said writing lead.

References Cited in the file of this patent

UNITED STATES PATENTS

| | | |
|---|---|---|
| 1,798,003 | Sitzler | Mar. 24, 1931 |
| 1,892,508 | Gonzalez | Dec. 27, 1932 |
| 1,937,104 | Thomsen | Nov. 28, 1933 |
| 2,319,585 | Chesler | May 18, 1943 |
| 2,479,919 | Flood | Aug. 23, 1949 |
| 2,551,710 | Slaughter | May 8, 1951 |
| 2,736,897 | Parsons | Feb. 28, 1956 |

FOREIGN PATENTS

| | | |
|---|---|---|
| 704,063 | Great Britain | Feb. 17, 1954 |